April 13, 1965 P. H. CROFT 3,178,204
UNIVERSALLY INSTALLABLE TRAILER HITCH BUMPER CLAMP
Original Filed Aug. 22, 1961

INVENTOR.
PAUL H. CROFT
BY Mathis and Graybeal
ATTORNEYS

United States Patent Office 3,178,204
Patented Apr. 13, 1965

3,178,204
UNIVERSALLY INSTALLABLE TRAILER HITCH BUMPER CLAMP
Paul H. Croft, Tacoma, Wash., assignor to Croft Trailer Company, Tacoma, Wash., a partnership
Continuation of application Ser. No. 133,126, Aug. 22, 1961. This application Oct. 7, 1963, Ser. No. 320,246
5 Claims. (Cl. 280—502)

This application is a continuation of my copending application Serial No. 133,126 now abandoned, bearing the same title and filed August 22, 1961.

This invention is an improvement of the trailer hitch bumper clamp disclosed and claimed in my U.S. Patent No. 2,814,506, issued November 26, 1957.

The present invention relates to hitch clamps, and more particularly to detachable trailer hitch bumper clamps especially adapted to be universally installable on automotive rear bumpers of widely variant contours, as encountered in the trailer rental field, for example.

In the trailer rental field, a serious problem is presented in providing hitch clamps which are capable of being quickly and securely mountable on any of the wide variety of rear bumpers as may be presented by various customers' automobiles. In certain late model cars, for example, the rear bumper on its underside is very closely situated to the mud pan or frame of the vehicle so that various types of hitch clamps in common use which involve multi-tooth hitch jaws, such as disclosed in said Patent No. 2,814,506, cannot be properly fitted on these cars without use of special adapters. On many cars, also, rigid jaw hitch clamps are difficult to place if the hitch ball is to be in proper pulling attitude and the clamp securely seated against the crown of the bumper, such as when the upper and lower bumper edges are rolled over sharply or when the bumper contour involves a full reverse bend.

In order to have universal mounting characteristics, a trailer hitch bumper clamp must have bumper edge engaging means which are adjustable as to length and also as to bumper contour following characteristics, both above and below the ball mounting portion of the clamp. If adjustable length means such as link chains are used to connect to upper and lower bumper edge engaging hooks, there is a problem of also providing means for securely tightening the hitch plate rigidly seated against the bumper and in proper attitude against the crown of the bumper so that the hitch ball member is substantially vertical, and maintained so under conditions of strenuous use. Unless means are provided to apply pull on the upper and lower bumper hook chains in direction approximately in alignment with the attitude of the chains as they approach the crown of the bumper, i.e. tangentially of the bumper crown, the clamp will not be securely seated against the bumper, and there is likelihood that the hitch will "flop" under hauling conditions, i.e. when varying hauling strains are exerted downwardly and upwardly as well as rearwardly on the clamp.

In order to provide a fully adjustable, sturdy, easily and properly installable, and easily detachable trailer hitch bumper clamp capable of use on any type of rear bumper contour, the trailer hitch bumper clamp of the present invention provides upwardly extending hook-ended, adjustable oval link chain means, and downwardly extending, hook-ended, adjustable oval link chain means, with the upwardly extending chain means being adjustable as to length in chain link receiving slots and with the downwardly extending chain means also being adjustable as to length in chain link receiving slots, the trailer hitch bumper lamp construction further providing rectilinearly tightenable, non-rotatable bolt block means with chain link receiving slot means, mounted to be tightenable in guide slot means oriented to apply tension to the chain means substantially tangentially of the bumper crown, i.e. in a line of direction approximately parallel to the portion of the bumper crown next to the chain link receiving slot of the bolt block means.

These characteristics as well as other features of hitch clamps embodying the invention will be apparent to those skilled in the art to which the present invention is addressed, from the following description accompanying illustration of various typical and therefore non-limitive forms thereof, wherein like numerals refer to like parts, and wherein.

Figure 1:
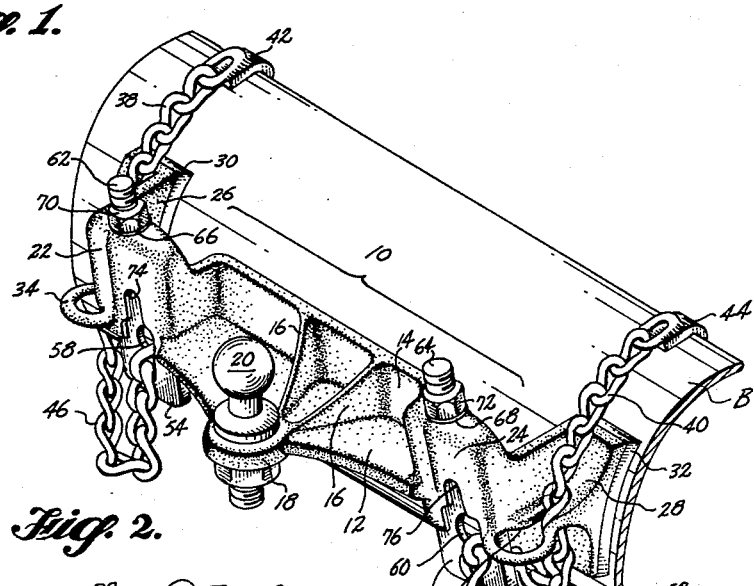
FIG. 1 is an isometric view of a trailer hitch bumper clamp embodying construction characteristic of the invention and involving two slotted bolt blocks disposed at the sides of a centrally mounted hitch ball member, such hitch clamp being shown in installed position on a typically contoured rear bumper, shown fragmentarily.
Figure 2:
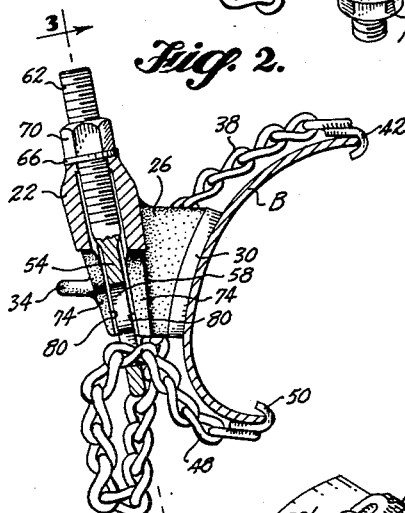
FIG. 2 is a view in transverse cross-section of the hitch bumper clamp shown in FIG. 1, taken substantially centrally through one of the bolt blocks thereof, e.g. taken substantially along line 2—2 of FIG. 3.
Figure 3:
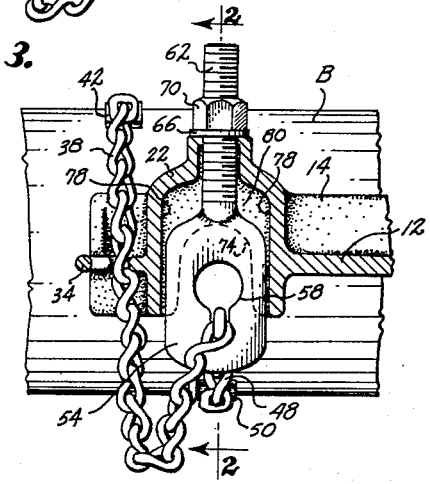
FIG. 3 is a view on a somewhat enlarged scale of the end portion of the hitch bumper clamp shown in FIGS. 1 and 2, taken substantially along line 3—3 of FIG. 2.

One form of bumper clamp according to the invention, as shown in FIGS. 1–3 in mounted position on an automotive rear bumper B, comprises a preferably cast and integrally formed frame or body 10, configured to have a generally horizontal panel 12, a generally vertically front panel 14, and stiffening ribs 16, said generally horizontal panel 12 providing a hitch ball receiving eye 18 centrally thereof in which is mounted hitch receiving ball member 20. Said frame 10 further comprises, as integral portions thereof, domed bolt block housings 22, 24 arranged near the ends of frame 10 and joined by horizontal panel 12 and vertical panels 14. Also provided as integral portions of frame 10 are respective end-arranged butt plates or feet 26, 28, which preferably have provided on the bumper crown engaging surfaces thereof respective resilient pads 30, 32 of rubber or like material to safeguard against damage of the bumper finisher, in a manner known per se. As clearly illustrated, the bolt block housings 22, 24 are spaced wholly rearwardly of the butt plates 26, 28.

Also arranged at the ends of frame 10 are integrally formed, respective chain link receiving slots 34, 36, configured to have a narrow dimension next to butt plates 26, 28 and a relatively wide dimension outwardly thereof so that the upwardly extending hook chains 38, 40, can be moved to any desired link position in slots 34, 36 in the wide dimension thereof, and can be set and secured at any particular chain link by placement of the link in the narrow dimension portion of the respective slots 34, 36 to provide whatever lengths of hook chains 38, 40 are desired. The respective bumper edge engaging hooks 42, 44 and chains 38, 40 can thus be placed to locate the frame 10 and particularly the butt plates 26, 28 on the crown of bumper B so that the axis of ball member 20 is in the desired, substantially vertical attitude when said butt plates 26, 28 are seated on the bumper B.

To the extent of the above-described components, the hitch bumper clamps illustrated at FIGS. 1–3 is essentially similar to the type of hitch disclosed in my aforesaid U.S. Patent No. 2,814,506, as well as that disclosed in Puccio U.S. Patent No. 2,938,739. However, rather than the downwardly extending, rigid jaw clamp characteristic of such prior hitch clamps, the hitch bumper clamp of the present invention provides for much greater adaptability of the lower hook means by having fully adjustable and securely tightenable lower hook chain means comprising chains 46, 48, terminating lower hooks 50, 52, and adjustable as to length in respective bolt blocks 54, 56 by means of chain link receiving slots 58, 60 in said bolt blocks 54, 56. Said chain link receiving slots 58, 60 are configured in a manner similar to the upper chain link receiving slots 34, 36 in that each has a relatively narrow dimension in which a selected link of the chain is placeable to anchor the chain, and a portion of relatively large dimension through which the chain can be passed to bring any desired link in a position with respect to the narrow portion of the slot, for length adjustment.

The chain means 38, 40, 46, 48, and respective terminal hooks 42, 44, 50, 52, are fully adaptable in any orientation desired with respect to the vehicle bumper and surrounding structure. Thus, while illustrated with respect to bumper B in engagement with the upper and lower edges of the bumper, installation usage can as well involve any given hook being led to and seated against any appropriate structure form adjacent to the bumper, such as the vehicle frame, a bumper guard, or bumper brace, for example.

Bolt blocks 54, 56 also comprise upwardly directed bolt portions 62, 64 which extend through respective bolt housings 22, 24 of frame 10. Lock washers 66, 68 and adjustment nuts 70, 72 are provided on bolt portions 62, 64, and as will be apparent the tightening of nuts 70, 72 provided on bolt portions 62, 64 rectilinearly moves each of bolt blocks 54, 56 in bolt block housings 22, 24 to place the respective lower chains 46, 48 under tension and at the same time also place the upper chains 38, 40 under tension. The lower portions of said bolt block housings are respectively cut away, as at 74, 76 to permit full range of adjustment of nuts 70, 72 on threaded bolt portions 62, 64.

As shown at FIGS. 2 and 3, bolt block housings 22, 24 are configured in the lower portions thereof to rectilinearly guide respective bolt blocks 54, 56, by means of respective edge guide surfaces 78 and side guide surfaces 80 (specifically noting FIGS. 2 and 3). By means of said guide surfaces 78, 80, the tightening movement of the bolt blocks 54, 56 in bolt block housings 22, 24 is accomplished without twisting or without change of direction of pull. This rectilinear movement, in conjunction with the orientation of the guide surfaces 78, 80 at an angle of about 20-30° with respect to the general plane of bumper engaging front plates 26, 28 provide that the tightening tension exerted on the lower chains 46, 48 is applied in a direction substantially tangential to the curve of the portion of the crown of bumper B next to the lower chain link receiving slots 58, 60. This relation is important to a positive securing action of the bumper clamp on the bumper because, by virtue of such substantially tangentially directed tension on the lower chains, the tightening of the chains does not introduce any substantial degree of torque to tend to upset the seating of butt plates 26, 28 on the crown of the bumper B. Experience has shown that an angular relation between guide surfaces 78, 80 and the general plane of said butt plates 26, 28 of about 20-30° is the most advantageous for a substantially tangentially applied clamping action on the wide variety of bumper contours presented to the trailer rental industry.

Upper chain 38 and lower chain 46 can be interlinked, and likewise chains 40 and 48 can be interlinked, as shown in FIG. 3, to prevent inadvertent separation from frame 10, or can be separate non-connected chain lengths, as desired. In either event, of course, sufficient length of chain is provided for considerable length adjustment in slots 34, 36, 58, 60.

Figure 4:
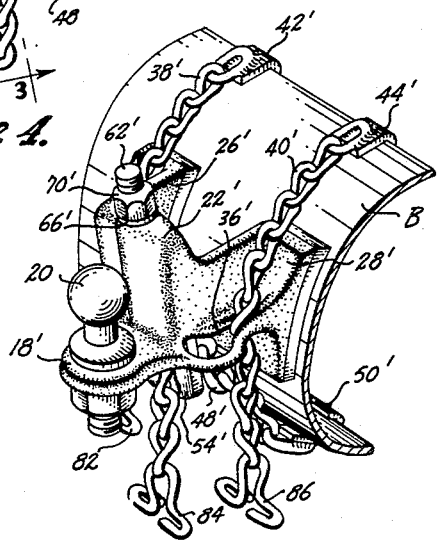
FIG. 4 is an isometric view similar to that of FIG. 1, showing a modified form of bumper clamp according to the present invention, involving a single downwardly extending chain means and associated bolt block.

FIG. 4 presents a modified embodiment characterizing the invention, wherein a single bolt block housing 22' is provided with a ball mounting eye 18' for ball member 20 to situate same directly rearwardly of said housing 22', and the end-arranged butt plates 26', 28' are situated to extend forwardly directly at the sides of said housing 22'. In this arrangement, upwardly extending chains 38', 40', and the respectively associated bumper edge engaging hooks 42', 44' are led from chain link receiving slots directly at the sides of said housing 22' (only slot 36' of these slots being in view in said FIG. 4). Bolt block housing 22' receives bolt block 54', with its associated bolt portion 62', lock washer 66', and nut 70'. Except as indicated, the clamp components identified by prime numerals in FIG. 4 are identical per se with the corresponding components presented by the earlier-discussed embodiment of the invention. Bolt block housing 22' is configured and oriented to have internally arranged edge guide surfaces and side guide surfaces like surfaces 78, 80 in housing 22 so that the attitude of bolt block 54' is oriented and functions with respect to butt plates 26', 28' in like manner as earlier discussed. Since the hitch bumper clamp modification shown by FIG. 4 embodies but a single bolt block 54', a single, downwardly extending hook chain 48' with its terminal bumper edge engaging hook 50' is employed. As will be apparent, said chain 48' clamps in opposition to chains 38', 40', with a substantially tangentially applied action, in like manner as the clamping action provided by the respective lower chains 46, 48 and upper chain 42, 44 of the earlier-discussed form of its bumper clamp.

To prevent accidental loss of the chains 38', 40' and 48', the respective ends thereof opposite from the hook provided ends are terminated by T-links 82, 84, 86. Alternatively, such non-hooked chain ends can be simply jointed by an interconnecting link for this purpose, if desired. As a further variation of the single bolt block type of hitch presented by FIG. 4, it will be readily apparent that a single upwardly extending chain hook means can be provided in lieu of chains 38', 40', which single chain hook means is employed in association with a chain link receiving slot configured like slot 36' and placed directly forwardly and centrally of bolt block housing 22' between butt plates 26', 28', thus providing a two chain version of the hitch bumper clamp.

A single bolt block type clamp, such as shown at FIG. 4 and such as the two chain version thereof discussed above, are well adapted to relatively light-duty use, or for use as a pair mounted in widespread position on a bumper and in turn interconnected by a tow bar spanned across same by connection to the clamp eyes, with the hitch of the tow connecting to a ball member situated centrally on the tow bar.

While the advantages of bumper clamps acording to the invention have been discussed primarily in connection with their versatility in meeting installation requirements in the trailer rental field, it will be readily apparent that such advantages equally pertain as to bumper clamps for unit sale, in that a single style of clamp can be fitted to any bumper contour.

These and other variations, modifications, adaptations, and features characteristic of the invention will be apparent to those skilled in the art within the scope of the following claims.

What is claimed is:
1. A trailer hitch bumper clamp comprising:
  (a) a cast frame having:
    (1) a central hitch ball mounting panel,
    (2) a pair of vertically elongated, relatively narrow butt plates situated outboardly and forwardly of said central panel, said butt plates each including forwardly directed bumper engaging surfaces,
    (3) vertically elongated bolt block housing means of box-like cross-section spaced wholly rearwardly and substantially wholly inboardly of said butt plates and comprising side walls, in- ternal bolt block guide means, and a top including a post receiving opening,
(4) generally parallel side wall extensions of said bolt block housing means extending forwardly from said bolt block housing means to the butt plates, and interconnecting said bolt block housing means and said butt plates,
(5) a generally horizontal flat portion of said frame extending rearwardly from each of said butt plates and outboardly from a side wall extension, and
(6) a keyhole opening in each of said flat portions of the frame comprising a rearwardly situated enlarged portion and a forwardly extending, interconnecting slot portion;
(b) a chain in each of said keyhole openings comprising a series of oval links, each of which encircles a portion of the next, said links being sized to freely pass through the enlarged portion of a keyhole opening but to be retained when engaged in the slot portion of said opening;
(c) a bumper edge engaging hook connected to the upper end of each of said chains;
(d) bolt block means rectilinearly movable in said bolt block housing means, said bolt block means comprising:
  (1) a relatively thin and flat bolt block mounted for rectilinear movement in said bolt block guide means, said bolt block including a keyhole opening having an enlarged upper portion and an interconnecting lower slot portion, and
  (2) a post attached at its lower end to an intermediate portion of the top edge of said bolt block and having a threaded upper portion extending upwardly through the opening in a top of the bolt block housing means;
(e) a chain in said keyhole opening of the bolt block comprising a series of oval links, each of which encircles a portion of the next, said links being sized to freely pass through the enlarged portion of said keyhole opening but to be retained when engaged in the slot portion of said opening;
(f) a bumper edge engaging hook at the lower end of said latter-mentioned chain;
(g) a nut threadedly engageable with the threaded upper portion of said rod above the top of the bolt block housing for causing rectilinear movement of the bolt block means; and
(h) a hitch ball affixed to said hitch ball mounting panel.

2. A trailer hitch bumper clamp comprising:
(a) a cast frame having:
  (1) a central panel portion including a generally horizontal hitch ball mounting panel having central location for a hitch ball and a forward edge, a substantially straight, generally vertical front panel having a lower edge formed integral with said front edge of the hitch ball mounting panel, said front panel also including an upper edge, and stiffening ribs interconnecting between said front panel and said hitch ball mounting panel, substantially immediately forwardly of the central location for the hitch ball,
  (2) a pair of butt plates situated outboardly and wholly forwardly of said central panel portion, said butt plates each including forwardly directed bumper engaging surfaces,
  (3) a vertically elongated bolt block housing of box-like cross-section situated wholly rearwardly and inboardly of each butt plate, each such bolt block housing having inboard and outboard side walls, internal bolt block guide means, and a top including a post receiving opening,
  (4) a forward extension of each of said outboard side walls interconnecting each bolt block housing with the associated butt plate near its inboard terminal,
  (5) side wall extensions of the inboard side walls interconnecting each of said bolt block housings with an end of the said front panel of the central panel portion,
  (6) a generally horizontal flat portion of said frame extending rearwardly from each of said butt plates and outboardly from the forward extension of a said outboard side wall, and
  (7) a keyhole opening in each of said flat portions of the frame comprising a rearwardly situated enlarged portion and a forwardly extending, interconnecting slot portion;
(b) a chain in each of said keyhole openings comprising a series of oval links, each of which encircles a portion of the next, said links being sized to freely pass through the enlarged portion of a keyhole opening but to be retained when engaged in the slot portion of said opening;
(c) a bumper edge engaging hook connected to the upper end of each of said chains;
(d) bolt block means rectilinearly movable in each said bolt block housing, said bolt block means comprising:
  (1) a relatively thin and flat bolt block mounted for rectilinear movement in the bolt block guide means of its housing, said bolt block including a keyhole opening having an enlarged upper portion and an interconnecting lower slot portion, and
  (2) a post attached at its lower end to an intermediate portion of the top edge of said bolt block and having a threaded upper portion extending upwardly through said opening in the top of its bolt block housing;
(e) a chain in the keyhole opening in the bolt block and comprising a series of oval links, each of which encircles a portion of the next, said links being sized to freely pass through the enlarged portion of said keyhole opening but to be retained when engaged in the slot portion of said opening;
(f) a bumper edge engaging hook at the lower end of said latter-mentioned chain;
(g) a nut threadedly engageable with the threaded upper portion of said rod above the top of the bolt block housing for causing rectilinear movement of the bolt block means; and
(h) a hitch ball affixed to said hitch ball mounting panel.

3. A bumper clamp according to claim 2, wherein each said bolt block guide means is an elongated inner cavity of the bolt block housing, the bolt block housings further include front and rear walls which together with the said side walls define said inner cavities, said front, rear and side walls of each bolt block housing all extending upwardly a substantial distance above the top edge of the said front panel of the frame and above the top edges of said side wall extensions, and with each of said front and rear walls including lower edges and arch-shaped openings extending upwardly from said lower edges to midportions of said front and rear walls, such openings accommodating portions of the chain when the bolt block means are positioned relatively high in their respective housings, and thus permitting full range of adjustment of said bolt block means.

4. In combination with a vehicle bumper of convexo-concavo cross-sectional configuration and having a forwardly and generally horizontally extending lower edge portion and a forwardly extending upper edge portion, a trailer hitch bumper clamp comprising:
(a) a cast frame having:
  (1) a central hitch ball mounting panel, (2) a laterally spaced pair of vertically elongated, relatively narrow butt plates situated wholly outboardly and forwardly of said central panel, said butt plates each inculding forwardly directed, vertically concave, bumper engaging surfaces, (3) vertically elongated bolt block housing means of box-like cross-section spaced wholly rearwardly of said butt plates and having a rear wall, a pair of generally parallel side walls merging into and forming rounded outside corners with said rear wall, internal bolt block guide means situated in a rearwardly inclining plane, and a dome shaped top that includes a post receiving opening, (4) generally parallel side wall extensions of said bolt block housing means interconnecting between the inboard terminal edge portions of said butt plates and said bolt block housing means, said bolt block housing extending upwardly a substantial distance above the respective upper edges of said side wall extensions;

(5) a generally horizontal flat portion of said frame extending rearwardly from each of said butt plates and outboardly from a side wall extension, and (6) a keyhole opening in each of said flat portions of the frame comprising a rearwardly situated enlarged portion and a forwardly extending, interconnecting slot portion;

(b) a chain in each of said keyhole openings comprising a series of oval links, each of which encircles a portion of the next, said links being sized to freely pass through the enlarged portion of a keyhole opening but to be retained when engaged in the slot portion of said opening;

(c) a bumper upper edge engaging hook connected to the upper end of each of said chains and in engagement with the upper edge of said bumper;

(d) rearwardly inclining bolt block means rectilinearly movable in said bolt block housing means, said bolt block means comprising:

(1) a relatively thin and flat bolt block mounted for rectilinear movement in said rearwardly inclining bolt block guide means, said bolt block including a keyhole opening having an enlarged upper portion and an interconnecting lower slot portion, and (2) a post attached at its lower end to an intermediate portion of the top edge of said bolt block and having a threaded upper portion extending upwardly through said opening in the top of the bolt block housing means;

(e) a chain in said keyhole opening in the bolt block and comprising a series of oval links, each of which encircles a portion of the next, said links being sized to freely pass through the enlarged portion of said keyhole opening but to be retained when engaged in the slot portion of said opening;

(f) a bumper lower edge engaging hook at the lower end of such latter-mentioned chains and in engagement with the upper edge of said bumper;

(g) a nut threadedly engageable with the threaded upper portion of said rod above the top of the bolt block housing for causing rectilinear movement of the rearwardly inclining bolt block means; and (h) a hitch ball affixed to said hitch ball mounting panel.

5. A bumper clamp according to claim 4, wherein the guide means in said bolt block housing means are arranged at an angle of about 20°–30° with respect to the general plane of engagement of said butt plate means with the bumper crown.

References Cited by the Examiner

UNITED STATES PATENTS

| | | | |
|---|---|---|---|
| 2,488,415 | 11/49 | Klein | 280—505 |
| 2,772,099 | 11/56 | Smith | 280—502 |
| 2,791,445 | 5/57 | Wanamaker | 280—502 |
| 2,814,506 | 11/57 | Croft | 280—502 |

A. HARRY LEVY, *Primary Examiner.*

LEO FRIAGLIA, *Examiner.*